US011708987B2

(12) United States Patent
Hallendy et al.

(10) Patent No.: US 11,708,987 B2
(45) Date of Patent: Jul. 25, 2023

(54) SYSTEM AND METHOD FOR CONFIGURING ANALYTIC RULES TO EQUIPMENT BASED UPON BUILDING DATA

(71) Applicant: RESOLUTE BUILDING INTELLIGENCE, LLC, Birmingham, MI (US)

(72) Inventors: Chris Hallendy, Macomb, MI (US); Carlos Devoto, Plymouth, MI (US); Justin Bootcheck, Royal Oak, MI (US); Chad Ruch, Royal Oak, MI (US); Keith Murphy, Mt. Clemens, MI (US)

(73) Assignee: RESOLUTE BUILDING INTELLIGENCE, LLC, Birmingham, MI (US)

( * ) Notice: Subject to any disclaimer, the term of this patent is extended or adjusted under 35 U.S.C. 154(b) by 0 days.

(21) Appl. No.: 17/191,368

(22) Filed: Mar. 3, 2021

(65) Prior Publication Data
US 2021/0215368 A1    Jul. 15, 2021

Related U.S. Application Data

(63) Continuation of application No. 16/558,559, filed on Sep. 3, 2019, now Pat. No. 10,976,068.

(51) Int. Cl.
*F24F 11/46* (2018.01)
*F24F 11/64* (2018.01)
*G05B 15/02* (2006.01)

(52) U.S. Cl.
CPC .............. *F24F 11/46* (2018.01); *F24F 11/64* (2018.01); *G05B 15/02* (2013.01)

(58) Field of Classification Search
CPC ........... F24F 11/46; F24F 11/64; G05B 15/02; G05B 2219/2642
See application file for complete search history.

(56) References Cited

U.S. PATENT DOCUMENTS 8,015,547 B2    9/2011  Harvey et al.
9,190,844 B2   11/2015  Tran
(Continued)

OTHER PUBLICATIONS

JBD Engineering, Inc.; Air System Basics: VAV; 2019.
(Continued)

*Primary Examiner* — Shon G Foley
(74) *Attorney, Agent, or Firm* — Clark Hill PLC; John S. Paniaguas

(57) ABSTRACT

An energy management system is disclosed for optimizing energy usage of HVAC equipment in a building complex. The energy management system is configured to be integrated into an existing Building Automation System ("BAS system") in order to process the data points in a less time consuming and efficient manner relative to known systems that map one point at a time. The BAS system data points are "point mapped", i.e., uploaded to a file in the "cloud", and are updated continuously as a function of time and deposited in a "bucket" in which the data points are unfiltered. These data points can then be filtered by node path and equipment in order to bulk tag equipment and bulk tag points in each of the buildings. These bulk tagged points data points can then be linked to specific rules in an analytical rules library. The system automatically applies predetermined analytical rules to tagged HVAC data points without specific knowledge of the rule by the user. These analytical rules are used to determine energy usage for each type of equipment and are pre-stored in the cloud. By selecting an equipment type, the correct analytical rule is automatically applied in bulk to (Continued)

the selected HVAC equipment type, and a report may be selectively generated for the selected piece(s) of HVAC equipment.

12 Claims, 16 Drawing Sheets

(56) References Cited

U.S. PATENT DOCUMENTS

| | | | |
|---|---|---|---|
| 9,262,371 | B2 | 2/2016 | Finnerty et al. |
| 9,294,357 | B2 | 3/2016 | Ferre et al. |
| 9,606,520 | B2 | 3/2017 | Noboa et al. |
| 9,612,286 | B2 | 4/2017 | Gupta et al. |
| 9,672,360 | B2 | 6/2017 | Barkan |
| 9,995,501 | B2 | 6/2018 | Quam et al. |
| 10,055,114 | B2 * | 8/2018 | Shah .................... G06F 3/0482 |
| 10,055,966 | B2 | 8/2018 | Foster et al. |
| 10,088,818 | B1 | 10/2018 | Mathews et al. |
| 10,181,959 | B2 | 1/2019 | Koeninger |
| 10,235,231 | B2 | 3/2019 | Zhang et al. |
| 10,320,763 | B2 | 6/2019 | Erickson et al. |
| 10,564,616 | B2 * | 2/2020 | Nayak .................... G06F 3/0486 |
| 11,016,648 | B2 * | 5/2021 | Fala .................... G06Q 10/067 |
| 11,038,706 | B2 * | 6/2021 | Malakuti ............. H04L 12/2807 |
| 11,079,727 | B2 * | 8/2021 | Piaskowski ............ G05B 15/02 |
| 2003/0114950 | A1 | 6/2003 | Ruth et al. |
| 2007/0028220 | A1 | 2/2007 | Miller et al. |
| 2014/0214464 | A1 | 7/2014 | Willis et al. |
| 2015/0372865 | A1 | 12/2015 | Schmirler et al. |
| 2016/0335731 | A1 | 11/2016 | Hall |
| 2016/0370775 | A1 | 12/2016 | Daugherty et al. |
| 2017/0212668 | A1 | 7/2017 | Shah et al. |
| 2017/0329292 | A1 | 11/2017 | Piaskowski et al. |
| 2017/0354350 | A1 | 12/2017 | Di Croce et al. |
| 2018/0039238 | A1 | 2/2018 | Gartner et al. |
| 2018/0267784 | A1 | 9/2018 | Wang et al. |
| 2018/0284756 | A1 | 10/2018 | Celia et al. |
| 2018/0341241 | A1 | 11/2018 | Song |
| 2019/0178680 | A1 | 6/2019 | Kriss |
| 2019/0235455 | A1 | 8/2019 | Michals et al. |

OTHER PUBLICATIONS

PM Room & System Solutions EU; Belimo the Basics; 2008.
Prolon Controls; Prolon Datasheet.
Trane; Engineers Newsletter; vol. 45-3; 2016.
Bhatia; HVAC Design Overview of Variable Air Volume Systems; 2012.

* cited by examiner

List of Rules

- 1. Heating Systems
  - 1.1 Boilers
    - 1.1.3.1 - Boiler Leaving Water Temperature Greater Than Setpoint
    - 1.1.4.1 - Boiler Leaving Water Temperature Less Than Setpoint
    - 1.1.5.1 - Boiler Low Temperature Differential (Low Delta T)
    - 1.1.6.1 - Boiler Leaving Water Temperature Sensor Failure
    - 1.1.6.2 - Boiler Entering Water Temperature Sensor Failure
    - 1.1.6.3 - Outside Air Temperature Sensor Failure
    - 1.1.7.1 - Boiler Status Is Off When Commanded On
    - 1.1.8.1 - Boiler Status Is On When Commanded Off
    - 1.1.9.1 - Boiler Supply Water Temperature Setpoint Is Greater Than High Limit
    - 1.1.10.1 - Boiler Supply Water Temperature Is Greater Than High Limit
    - 1.1.12.1 - Boiler Supply Water Temperature Setpoint Can Be Decreased (Reset)
- 2. Chilled Water Systems
  - 2.1 Chillers
    - 2.1.3.1 - Chilled Water Leaving Temperature Greater Than Setpoint
    - 2.1.4.1 - Chilled Water Leaving Temperature Less Than Setpoint
    - 2.1.5.1 - Chiller Low Temperature Differential (Low Delta T)
    - 2.1.6.1 - Chilled Water Leaving Temperature Sensor Failure
    - 2.1.6.2 - Chilled Water Entering Temperature Sensor Failure
    - 2.1.6.3 - Condenser Water Entering Temperature Sensor Failure
    - 2.1.6.4 - Condenser Water Leaving Temperature Sensor Failure
    - 2.1.6.5 - Outside Air Temperature Sensor Failure
    - 2.1.7.1 - Chiller Status Is Off When Commanded On
    - 2.1.8.1 - Chiller Status Is On When Commanded Off
    - 2.1.9.1 - Chilled Water Supply Temperature Setpoint Is Less Than Low Limit
    - 2.1.12.1 - Chilled Water Supply Temperature Setpoint Can Be Increased (Reset)
  - 2.3 Cooling Towers
    - 2.3.5.1 - Condenser Water Entering Temperature Sensor Failure
    - 2.3.5.2 - Condenser Water Leaving Temperature Sensor Failure
- 3. Air Distribution Systems
  - 3.1 AHU's (air handling units, rooftop units, packaged units)
    - 3.1.1.1 - AHU Simultaneous Heating and Cooling
    - 3.1.3.1 - Free Cooling Is Not Maximized

Fig. 4A 3.1.4.1 - Outside Air Damper Position is Greater Than Minimum Setpoint
3.1.4.2 - Outside Airflow is Greater Than Minimum Setpoint
3.1.5.1 - Outside Air Damper Does Not Meet the Minimum Position Setpoint
3.1.6.1 - Percent Outside Air Calculated Is Greater Than Outside Air Damper Command
3.1.7.1 - Percent Outside Air Calculated Is Less Than Outside Air Damper Command
3.1.8.1 - Operating Outside of Schedule
3.1.9.1 - Discharge Air Temperature Sensor Failure
3.1.9.2 - Mixed Air Temperature Sensor Failure
3.1.9.3 - Return Air Temperature Sensor Failure
3.1.9.4 - Outside Air Temperature Sensor Failure
3.1.9.5 - Zone Temperature Sensor Failure
3.1.10.1 - Discharge Air Pressure Sensor Failure
3.1.10.2 - Building Air Pressure Sensor Failure
3.1.10.3 - Return Air Pressure Sensor Failure
3.1.10.4 - Zone Pressure Sensor Failure
3.1.11.1 - Discharge Air Humidity Sensor Failure
3.1.11.2 - Return Air Humidity Sensor Failure
3.1.11.3 - Outside Air Humidity Sensor Failure
3.1.11.4 - Zone Humidity Sensor Failure
3.1.12.1 - Discharge Airflow Sensor Failure
3.1.12.2 - Return Airflow Sensor Failure
3.1.12.3 - Outside Airflow Sensor Failure
3.1.12.4 - Exhaust Airflow Sensor Failure
3.1.14.1 - Discharge Air Fan VFD Invariant
3.1.14.2 - Discharge Air Fan VFD Invariant
3.1.15.1 - Discharge Fan Static Pressure Setpoint Is Greater Than High Limit
3.1.16.1 - Discharge Fan Static Pressure Is Greater Than Setpoint
3.1.17.1 - Discharge Fan Static Pressure Is Less Than Setpoint
3.1.19.1 - Outside Damper Open When Unit is Off
3.1.20.1 - Fan Status Off When Commanded On
3.1.21.1 - Fan Status On When Commanded Off
3.1.25.1 - Discharge Air Static Pressure Setpoint Can Be Decreased (Reset)
3.1.27.1 - Operating During Unoccupied Mode
3.1.28.1 - Zone Temperature Setpoint Dead Band Is Too Low

Fig. 4B

- 3.1.29.1 - AHU Outside Air Temperature Sensor Differs From The Building Outside Air Temperature Sensor
- 3.1.30.1 - AHU Outside Air Humidity Sensor Differs From The Building Outside Air Humidity Sensor
- 3.1.31.1 - Majority Of VAV's In Heating Mode
- 3.1.32.1 - Discharge Air Temperature Setpoint Is Less Than Low Limit
- 3.1.33.1 - Discharge Air Temperature Is Greater Than Setpoint
- 3.1.34.1 - Discharge Air Temperature Is Less Than Setpoint
- 3.1.35.1 - Unexpected Temperature Decrease Across Cooling Coil
- 3.1.36.1 - Unexpected Temperature Increase Across Heating Coil
- 3.1.37.1 - Low Temperature Differential Across Cooling Coil
- 3.1.38.1 - Low Temperature Differential Across Heating Coil
    - 3.2 VAV's (variable air volume boxes, fan powered boxes)
        - 3.2.4.1 - Heating Commanded On In Cooling Mode
        - 3.2.5.1 - Unexpected Increase in VAV Discharge Temperature
        - 3.2.6.1 - Cooling Mode with No Flow
        - 3.2.7.1 - Cooling Mode with Low Flow
        - 3.2.9.1 - VAV Zone Temperature Sensor Failure
        - 3.2.9.2 - VAV Discharge Air Temperature Sensor Failure
        - 3.2.10.1 - Excessive Airflow In Heating Mode
        - 3.2.11.1 - VAV Zone Humidity Sensor Failure
        - 3.2.16.1 - Occupied Zone Temperature Heating Setpoint Above High Limit
        - 3.2.17.1 - Occupied Zone Temperature Cooling Setpoint Below Low Limit
        - 3.2.18.1 - VAV Discharge Airflow Sensor Failure
        - 3.2.18.2 - VAV Return Airflow Sensor Failure
        - 3.2.19.1 - Zone Temperature Setpoint Dead Band Is Too Low
    - 3.3 FCU (fan coil units)
        - 3.3.1.1 - FCU Simultaneous Heating and Cooling
- 4. Meter
    - 4.1 Reading
        - 4.1.1.1 - Meter Loss Of Communication
        - 4.1.2.1 - Meter Data Is Invariant
    - 4.2 Electric
        - 4.2.3.1 - Electric Meter Accumulating Point Is Reporting Zero
        - 4.2.4.1 - Electric Meter Accumulating Point Is Reporting Null Data
        - 4.2.5.1 - Electric Meter Accumulating Point Is Reporting Negative Values

Fig. 4C

- 4.3 Gas
    - 4.3.3.1 - Gas Meter Accumulating Point Is Reporting Zero
    - 4.3.4.1 - Gas Meter Accumulating Point Is Reporting Null Data
    - 4.3.5.1 - Gas Meter Accumulating Point Is Reporting Negative Values
- 4.4 Water
    - 4.4.3.1 - Water Meter Accumulating Point Is Reporting Zero
    - 4.4.4.1 - Water Meter Accumulating Point Is Reporting Null Data
    - 4.4.5.1 - Water Meter Accumulating Point Is Reporting Negative Values

Fig. 4D

Point Templates Used in Rules

- (BldgPress) - Building Static Pressure
- (BlrCmd) - Boiler Command
- (BlrETemp) - Entering Water Temperature
- (BlrLTemp) - Leaving Water Temperature
- (BlrLTempSp) - Boiler Leaving Setpoint
- (BlrSts) - Boiler Status
- (CHWFlow) - Chilled Water Flow
- (CWETemp) - Condenser Water Entering Temperature
- (CWLTemp) - Condenser Water Leaving Temperature
- (ChWCPCmd) - Chilled Water Pump Command
- (ChWCPSts) - Chilled Water Pump Status
- (ChWETemp) - Chilled Water Entering Temperature
- (ChWEnergy) - Chilled Water Energy (accumulated)
- (ChWLTemp) - Chilled Water Leaving Temperature
- (ChWPower) - Chilled Water Power
- (ChWSp) - Chilled Water Setpoint
- (ChWVolume) - Chilled Water Volume (accumulated)
- (ChrCmd) - Chiller Command
- (ChrSts) - Chiller Status
- (ClgCmd) - Cooling Command
- (DaFanCmd) - DA Fan Command (single or common)
- (DaFanFreq) - DA Fan Frequency (single or common)
- (DaFanSpd) - DA Fan Speed (single or common)
- (DaFanSts) - DA Fan Status (single or common)
- (DaFlow) - Discharge Air Flow
- (DaFlowSp) - Discharge Air Flow Setpoint
- (DaHumidity) - DA Humidity
- (DaPress) - DA Pressure
- (DaPressSp) - DA Pressure Setpoint
- (DaTemp) - Discharge Air Temperature
- (DaTempSp) - DA Temp Setpoint
- (DmprPos) - Damper Position
- (EaFlow) - Exhaust Air Flow
- (EnergyTotalized) - Energy Total (accumulated)
- (GasVolumeTotalized) - Gas Volume Total (accumulated)
- (HtgCmd) - Heating Command
- (MaTemp) - Mixed Air Temp
- (OaDmprCmd) - Outside Air Damper Command (open/closed)

Fig. 4E

- (OaDmprMinPosSp) - Outside Air Damper Minimum Position Setpoint
- (OaFlow) - Outside Air Flow
- (OaFlowMinSp) - Outside Air Flow Minimum Setpoint
- (OaHumidity) - Outside Air Humidity
- (OaTemp) - Outside Air Temperature
- (Occ) - Occupied Mode
- (OccCoolSp) - Occupied Cooling Setpoint
- (OccHeatSp) - Occupied Heating Setpoint
- (RaFlow) - RA Air Flow
- (RaHumidity) - RA Humidity
- (RaPress) - RA Pressure
- (RaTemp) - RA Temp
- (RhtCmd) - Reheat Command
- (UnoccCoolSp) - Unoccupied Cooling Setpoint
- (UnoccHeatSp) - Unoccupied Heating Setpoint
- (WaterVolumeTotalized) - Domestic Water Volume Total (accumulated)
- (ZoneHumidity) - Zone Humidity
- (ZonePress) - Zone Pressure
- (ZoneTemp) - Zone Temperature

Fig. 4F

Synergy "Raw Points into Analytics" Process.xlsx, Sheet1

| | Page | Tab | Feature (Field/Dropdown/etc.) | Steps | Results |
|---|---|---|---|---|---|
| 1 | Bulk Point Mapper | Unmapped | Table | Lists all of the points that need to be mapped or ignored | N/A |
| 2 | Bulk Point Mapper | Unmapped | "Mapping" text box | To filter a point or points, enter appropriate filters individually or combined:<br>1) {point}<br>2) {equipment}<br>3) {floor}<br>4) {subBuilding}<br>5) {building}<br>Ex.1) /{building}/{equipment}/{point}<br>Ex.2) /Drivers/NiagaraNetwork/CentralMi/points/HVAC/AHU_01_OB/{point}<br>Ex.3) /Drivers/NiagaraNetwork/{building}/{subBuilding}/{floor}/{equipment}/{point}<br>And then click "Apply Filter" button | The table displays a list of matching points |
| 3 | Bulk Point Mapper | Unmapped | "Mapping" text box | To select point(s) from the table's filtered list:<br>1) Individual points by clicking each point's checkbox<br>2) All points by clicking the "All" checkbox | The selected points checkboxes will be highlighted |
| 4 | Bulk Point Mapper | Unmapped | "Mapping" text box | To map the selected points, click the "Map Points" button | The selected points:<br>1) Will be built into the customer hierarchy,<br>2) Will be removed from the "Unmapped" tab table,<br>3) Will be moved to the "Mapped" tab table,<br>4) The "Unmapped" point count at the top of the page will decrease by the number of selected points, and<br>5) The "Mapped" point count at the top of the page will |
| 5 | Node Move | N/A | "Search" text box | To verify that bulk mapped points are in the hierarchy, the hierarchy can be traversed using the "Search" text box to enter one of the listed "Nodes" and clicking the "Apply Filter" button. If needed, click the "Include Node Children Count By Type" checkbox. | The selected "Node" will be further decomposed and its "Nodes" will be displayed |
| 6 | Node Move | N/A | "Node" arrows | To verify that bulk mapped points are in the hierarchy, the hierarchy can be traversed clicking an arrow to the right of a Node to traverse the hierarchy and clicking the "Apply Filter" button. If needed, click the "Include Node Children Count By Type" checkbox. | The selected "Node" will be further decomposed and its "Nodes" will be displayed |
| 7 | Node Move | N/A | "Type" Drop Down | To verify that bulk mapped points are in the hierarchy after a building has been selected, the hierarchy can also be traversed using the "Type" drop down list by selecting:<br>1) Sub-Building<br>2) Floor<br>3) Equipment<br>4) Point<br>and clicking the "Apply Filter" button. If needed, click the "Include Node Children Count By Type" checkbox. | The selected "Node" will be further decomposed and its "Nodes" will be displayed |
| 8 | Node Move | N/A | "Node" table | To move a "Node" (Building, Sub-Building, Floor, Equipment, or Point) within the hierarchy, select one or more "Node", click the "Move" button, select where to move the "Node", click the "Approve Move" button | The selected "Nodes" will be moved to the selected move location |
| 9 | Bulk Equip Tagging | N/A | "Search Node Path" text box | To filter equipment, enter a "Node Path" and click the "Apply Filter" button | The table will display filtered results based upon the select search criteria. |
| 10 | Bulk Equip Tagging | N/A | "Search Display Name" text box | To filter equipment, enter a "Display Name" and click the "Apply Filter" button | The table will display filtered results based upon the select search criteria. |

Fig. 10A

Page 1

Synergy "Raw Points into Analytics" Process.xlsx, Sheet1

| | Page | Tab | Feature (Field/Dropdown/etc.) | Steps | Results |
|---|---|---|---|---|---|
| 11 | Bulk Equip Tagging | N/A | "Type" drop down | To filter equipment, click on the "Type" drop down, select any item except "Unspecified", and click the "Apply Filter" button | The table will display filtered results based upon the select search criteria. |
| 12 | Bulk Equip Tagging | N/A | "Equipment" table | To select equipment to tag (or re-tag) from the table's filtered list:<br>1) Individual equipment by clicking each equipment's checkbox<br>2) All equipment by clicking the "All" checkbox<br>Ex. Bulk change all VAV's by selecting "vav" in the "Type" dropdown, select "elecMeter" from the "Type2" dropdown | The selected equipment checkboxes will be highlighted |
| 13 | Bulk Equip Tagging | Type2 column | "Equipment" table | To tag (or re-tag) equipment, click on the "Type2" drop down for any equipment's "Unspecified" item, select any item except "Unspecified", and click the "Apply Changes" button | The selected equipment tags will be changed based upon the new tag criteria |
| 14 | Bulk Equip Tagging | Parent (Airside) column | "Equipment" table | To tag (or re-tag) equipment, click on the "Parent (Airside)" drop down for any equipment's "Unspecified" item, select any item except "Unspecified", and click the "Apply Changes" button | The selected equipment tags will be changed based upon the new tag criteria |
| 15 | Bulk Point Tagging | N/A | "Unique Name" checkbox | To filter points, click on the "Unique Name" checkbox and click the "Apply Filter" button | The table will display filtered results based upon the select search criteria. |
| 16 | Bulk Point Tagging | N/A | "Point Type" drop down | To filter points, click on the "Point Type" drop down, select from the drop down list, and click the "Apply Filter" button | The table will display filtered results based upon the select search criteria. |
| 17 | Bulk Point Tagging | N/A | "Parent Equipment" drop down | To filter points, click on the "Parent Equipment" drop down, select from the drop down list, and click the "Apply Filter" button | The table will display filtered results based upon the select search criteria. |
| 18 | Bulk Point Tagging | N/A | "Search Name" text box | To filter points, enter a "Search Name" and click the "Apply Filter" button | The table will display filtered results based upon the select search criteria. |
| 19 | Bulk Point Tagging | N/A | "Search Display Name" text box | To filter points, enter a "Search Display Name" and click the "Apply Filter" button | The table will display filtered results based upon the select search criteria. |
| 20 | Bulk Point Tagging | N/A | "Units" drop down | To filter points, click on the "Units" drop down, select from the drop down list, and click the "Apply Filter" button | The table will display filtered results based upon the select search criteria. |
| 21 | Bulk Point Tagging | N/A | "Point" table | To select points from the table's filtered list:<br>1) Individual points by clicking each point's checkbox<br>2) All points by clicking the "All" checkbox | The selected point checkboxes will be highlighted |
| 22 | Bulk Point Tagging | N/A | "Point Template" drop down | To tag selected points, for each "Unspecified" row, select the appropriate "Point Template" dropdown (that is only specific to that point group's parent), and click the "Apply Changes" button | The selected points' Display Name, Unit, and tags are updated accordingly |
| 23 | Bulk Rules | Candidates | "Search Node Path" text box | To filter equipment, enter a "Node Path" and click the "Apply Filter" button | The table will display filtered results based upon the select search criteria. |
| 24 | Bulk Rules | Candidates | "Equipment Type" drop down | To filter equipment, click on the "Equipment Type" drop down, select from the drop down list, and click the "Apply Filter" button | The table will display filtered results based upon the select search criteria. |
| 25 | Bulk Rules | Candidates | "Rule" drop down | To filter equipment, click on the "Rule Type" drop down, select from the drop down list, and click the "Apply Filter" button | The table will display filtered results based upon the select search criteria. |
| 26 | Bulk Rules | Candidates | "Rule" drop down | To select equipment from the table's filtered list to apply a "Rule":<br>1) Individual equipment by clicking each equipment's checkbox<br>2) All equipment by clicking the "All" checkbox | The selected point checkboxes will be highlighted |
| 27 | Bulk Rules | Candidates | "Rule" drop down | To apply a "Rule" to the equipment, select the "Rule" from the "Rule" drop down list, and click the "Apply Filter" button | The selected equipment have the selected "Rule" applied to them |
| 28 | Bulk Rules | Incidences | "Rules" Table | Lists all equipment with applied "Rules" | N/A |

Fig. 10B

US 11,708,987 B2

SYSTEM AND METHOD FOR CONFIGURING ANALYTIC RULES TO EQUIPMENT BASED UPON BUILDING DATA

BACKGROUND OF THE INVENTION

1. Field of the Invention

The present invention relates to a system for collecting HVAC data from a Building Automation System ("BAS system") and analyzing that data in real time in order to manage energy use and efficiency.

2. Description of the Prior Art

BAS systems are known. Examples of such BAS systems are disclosed in detail in U.S. Pat. No. 9,262,371 and US Patent Application Publication No. US 2018/0341241 A1. Known BAS systems are used to control and monitor heating ventilating and control ("HVAC") systems in commercial buildings. In order to control HVAC equipment, BAS systems track a voluminous number of raw data points to control HVAC equipment.

HVAC systems are a significant and growing part of the country's energy resources. One drawback of such BAS systems is they do not optimize HVAC energy usage. Such systems do not operate in real time and therefore cannot trend HVAC equipment data and cannot optimize HVAC energy usage. Energy management systems are known and can be integrated with BAS systems to optimize energy usage in building complexes, such as commercial building complexes, and can track energy usage in real time.

In order to optimize HVAC energy usage, equipment data as a function of time is required along with hierarchal models of the buildings in a building complex. Rather than create data points for the building and the equipment, known energy management systems utilize raw data points from the BAS systems. The naming system for each of such raw data points may include; names of the buildings, equipment and raw data. Each BAS system vendor uses their own naming system for the raw data points. These naming systems often use cryptic character strings to identify the equipment, the location of the equipment and sensor output data. These cryptic designations must be deciphered in order to be used in an energy management system. An exemplary character string for a BAS system raw data point may be as follows: "NiagaraNetwork/redicoBCN/points/ChlrPlant/Chlr2/ChlrPts/DischAirTemp". This character string refers to one of the Niagara building complexes, referred to as the Redico BCN (Blue Care Network). It also identifies the sensor data as discharge air temperature from the #2 Chiller Plant at that facility. Other BAS system suppliers are known to use different naming conventions.

In large commercial building complexes, the raw data points in such BAS systems can consist of thousands of raw data points. Each data point must be deciphered and mapped to a specific piece of equipment in the building complex in order to manage the energy usage and efficiency. These data points are then processed by analytics in order to optimize the energy usage. Heretofore, processing raw data points for use in energy management systems has been done manually; only one point at a time. With thousands of data points, this process can be extremely time consuming and take months.

What is needed is an automated method for processing BAS system data points for energy management systems that allows the data points to be processed in hours rather than months.

SUMMARY OF THE INVENTION

Briefly, the present invention relates to an energy management system for optimizing energy usage of HVAC equipment in a building complex. The energy management system is configured to be integrated into an existing Building Automation System ("BAS system") in order to process the data points in a less time consuming and efficient manner relative to known systems that map one point at a time. The BAS system data points are "point mapped", i.e., uploaded to a file in the "cloud", and are updated continuously as a function of time and deposited in a "bucket" in which the data points are unfiltered. These data points can then be filtered by node path and equipment in order to bulk tag equipment and bulk tag points in each of the buildings. These bulk tagged data points can then be linked to rules in an analytical rules library. The system automatically applies predetermined analytical rules to tagged HVAC data points without specific knowledge of the rule by the user. These analytical rules are used to determine energy usage for each type of equipment and are pre-stored in the cloud. By selecting an equipment type, the correct analytical rule is automatically applied in bulk to the selected HVAC equipment type, and a report may be selectively generated for the selected piece(s) of HVAC equipment.

DESCRIPTION OF THE DRAWING

These and other advantages of the present invention will be readily understood with reference to the following specification and attached drawing wherein:

FIGS. 4A-4F is an exemplary set of analytical rules for use in the energy management system.

FIGS. 10A and 10B illustrate the principles of operation of the energy management system.

DETAILED DESCRIPTION

The present invention relates to an energy management system for optimizing energy usage of HVAC equipment in a building complex. The energy management system is configured to be integrated into an existing Building Automation System ("BAS system") in order to process the HVAC data points in a less time-consuming and efficient manner relative to known systems that map one point at a time. The BAS system data points are "point mapped", i.e., uploaded to a file in the "cloud", and are updated continuously as a function of time and deposited in a "bucket" in which the data points are unfiltered. These data points can then be filtered by node path and equipment in order to bulk tag equipment and bulk tag points in each of the buildings. These bulk tagged data points can then be linked to rules in an analytical rules library. The system automatically applies the predetermined analytical rules to tagged data points without specific knowledge of the rule by the user. These analytical rules are used to determine energy usage for each type of equipment and are pre-stored in the cloud. By selecting an equipment type, the correct analytical rule is automatically applied in bulk to the selected HVAC equipment type, and a report may be selectively generated for the selected piece(s) of HVAC equipment.

Figure 1:
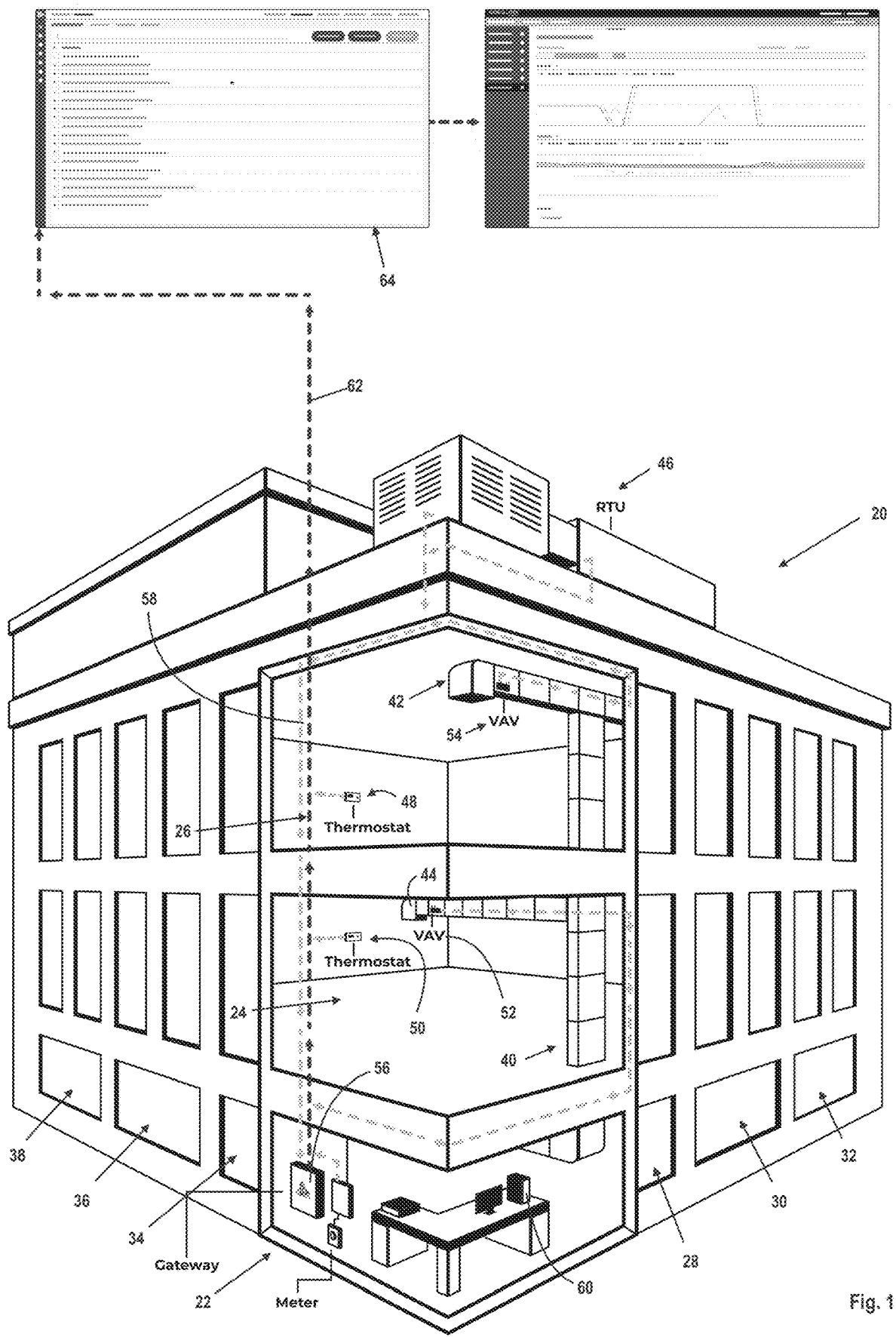
FIG. 1 is an isometric view of a building, partially cut away, illustrating various pieces of equipment in the cut-away portion of the building and the data flow path of the data from the equipment to a gateway and from the gateway to the energy management system.

Before getting into the specifics of the energy management system, it is necessary to put the system in context. Referring to FIG. 1, an exemplary building 20 is shown with a corner cut-out to provide a simplified illustration of the BAS system equipment installed by the BAS system contractor in that portion of the building. As shown, the building has 3 floors: 22, 24 and 26. Each floor 22, 24 and 26 has multiple HVAC zones. For example, the first floor 22 has zones 28, 30, 32, 34, 36 and 38. Floors 24 and 26 each have multiple HVAC zones.

As shown an air duct 40 extends from the top floor 26 through the middle floor 24 and to the bottom floor 22. Air discharge ports 42 and 44 extending from the air duct are shown for floors 24 and 26. A roof top unit ("RTU") 46 is used for providing both heating and cooling air to the air duct 40 as a function of the set points of the thermostats 48 and 50 on floors 26 and 24 respectively.

The exemplary configuration shown is a variable air volume ("VAV") system. Such systems are well known and work on the principle of providing a constant temperature and varying the volume. In the example shown, each of the air discharge ports include a damper (not shown) that is controlled by a VAV controller 52, 54. The RTU 46 supplies constant air temperature to the vertical air duct 40. The temperature in each zone is adjusted by varying the damper position in the discharge port 42, 44.

In a typical BAS system, all of the sensor and equipment data is routed to a gateway 56, as shown by the dotted line 58. These data points are routed to a central controller for control and monitoring of the HVAC equipment in a building. As mentioned above for a complex commercial building, there can be thousands of points.

Figure 2:
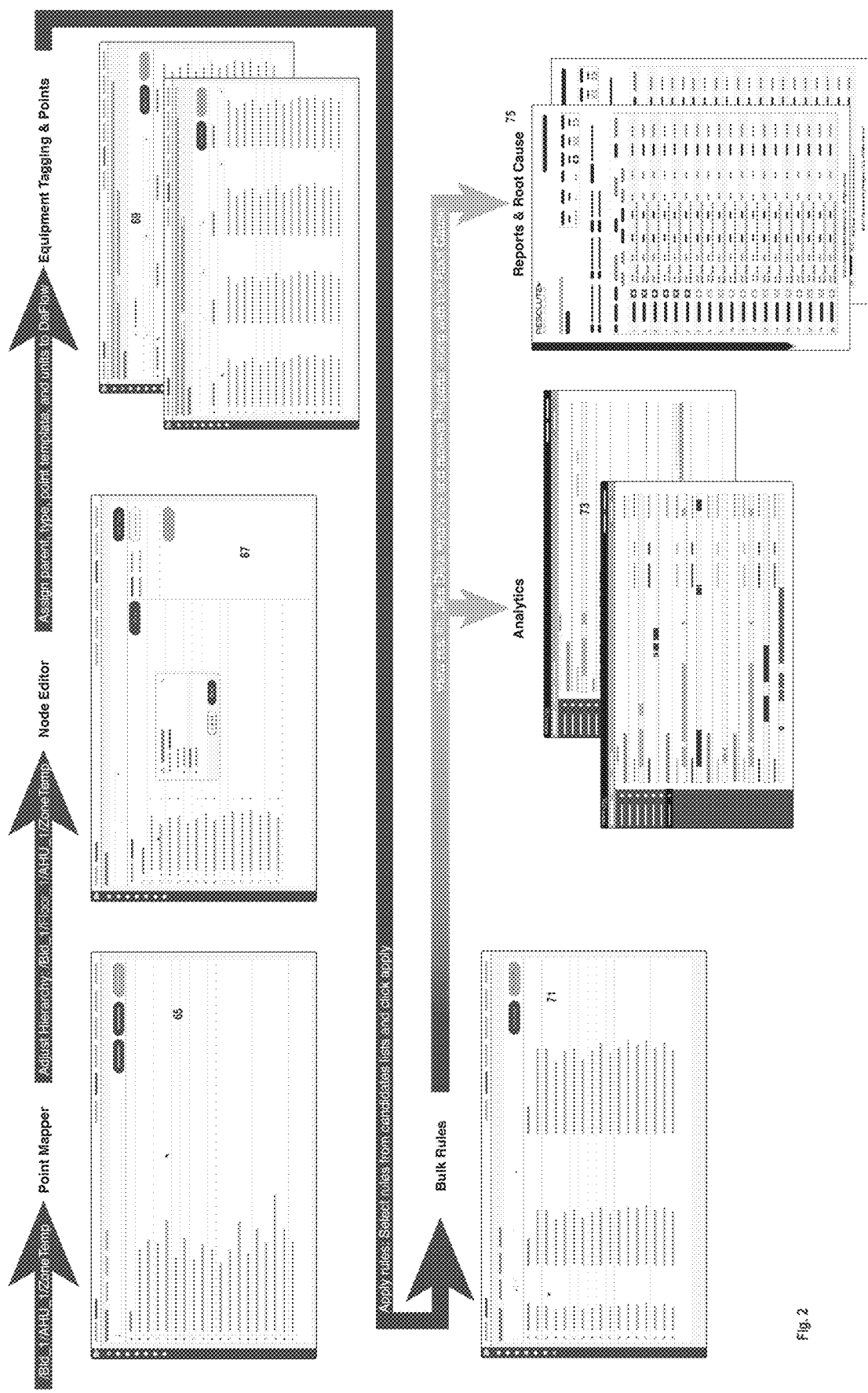
FIG. 2 is a simplified process flow diagram for the energy management system.

The energy management system in accordance with the present invention has multiple operating nodes. Referring to FIG. 2, these operating modes include: point mapping 65, node editing 67, equipment and point tagging 69, and applying bulk analytical rules 71 to equipment and nodes. The bulk rules mode relates to previously stored analytical rules that are linked to specific pieces of equipment. These rules are used to process mapped data points into customized energy management reports 73 and 75, as shown in FIG. 2.

Figure 3:
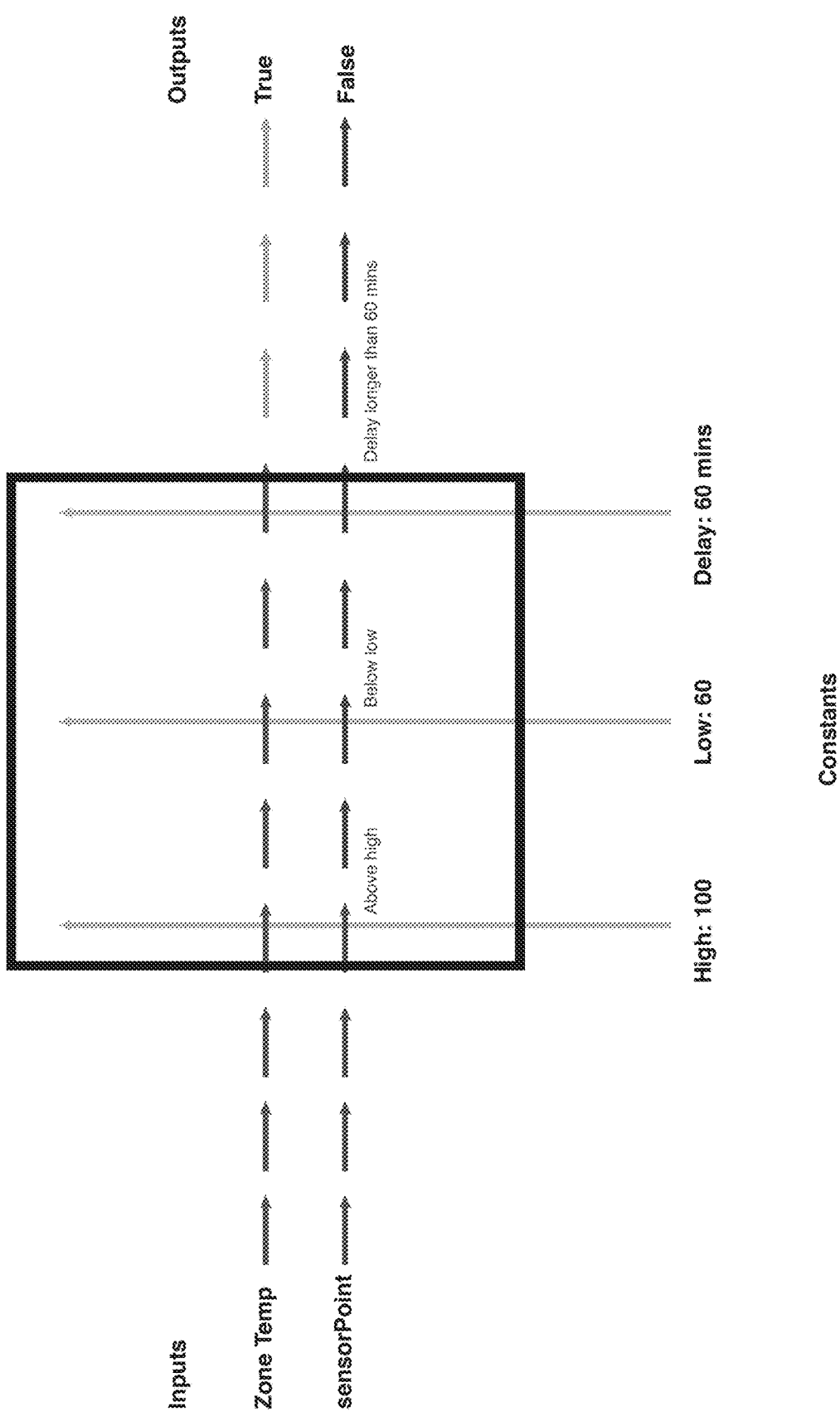
FIG. 3 is an exemplary rule for discharge air temperature failure.

An exemplary rule is illustrated in FIG. 3. This rule automatically analyzes temperature in a selected zone. More specifically, the rule compares zone temperature with set points. In this example, the set points are 60 and 100 degrees F. and lapses of data for over 60 minutes. In this example, a zone temperature less than 60 degrees, more than 100 degrees, or lapses of data of over 60 minutes generate a false signal, indicating an anomaly in that zone.

FIGS. 4A-4F illustrate an exemplary list of the type of analytical rules that can be used in the energy management system. This list of exemplary analytical rules can be based on various system temperature and pressure set points as well as various equipment and sensor failures and anomalies in an HVAC system that effect the system efficiency.

In order to map the raw data points from the BAS system into the cloud for processing, the system taps the gateway 56 (FIG. 1) and uses point mapping to map all of the BAS system raw data points into a file in a scalable cloud architecture, shown by the dotted line 62. These raw data points are saved in a single unsorted field in a spread sheet or "bucket".

As will be discussed in more detail below, once the raw data points have been mapped to the bucket, further processing of the raw data points is in the cloud. The processing includes filtering the raw data for facilitating searching building hierarchy nodes, for example, by building, sub-building, floor equipment and points in a similar manner as data is filtered in a file on an Excel spreadsheet. A detailed description of the processing of the raw data points is illustrated in FIGS. 10A and 10B. FIGS. 5-9 illustrate examples for processing of the raw data points.

Figure 5:
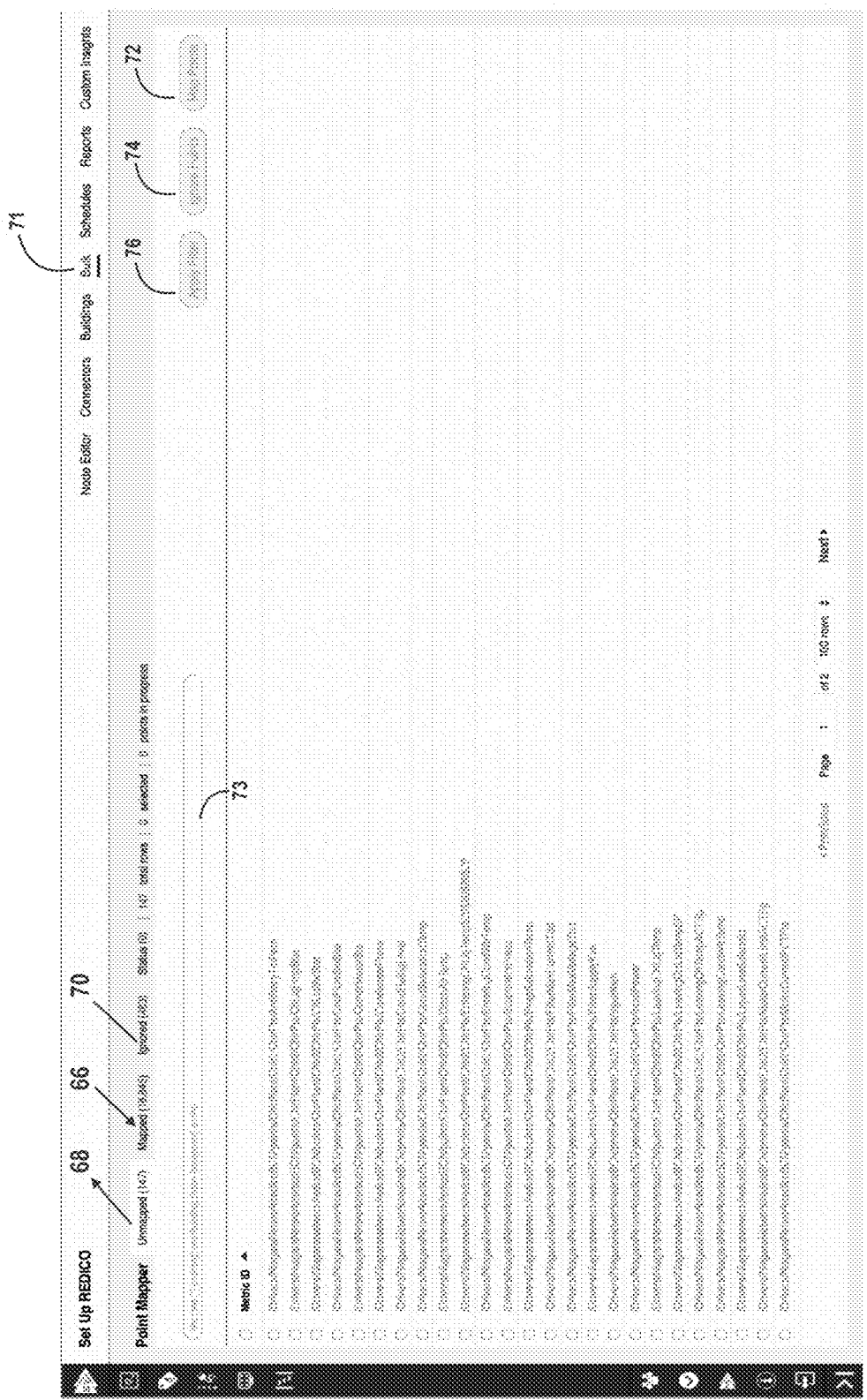
FIG. 5 is a screen shot of the raw data points after being mapped to a file in the cloud.
Figure 6:
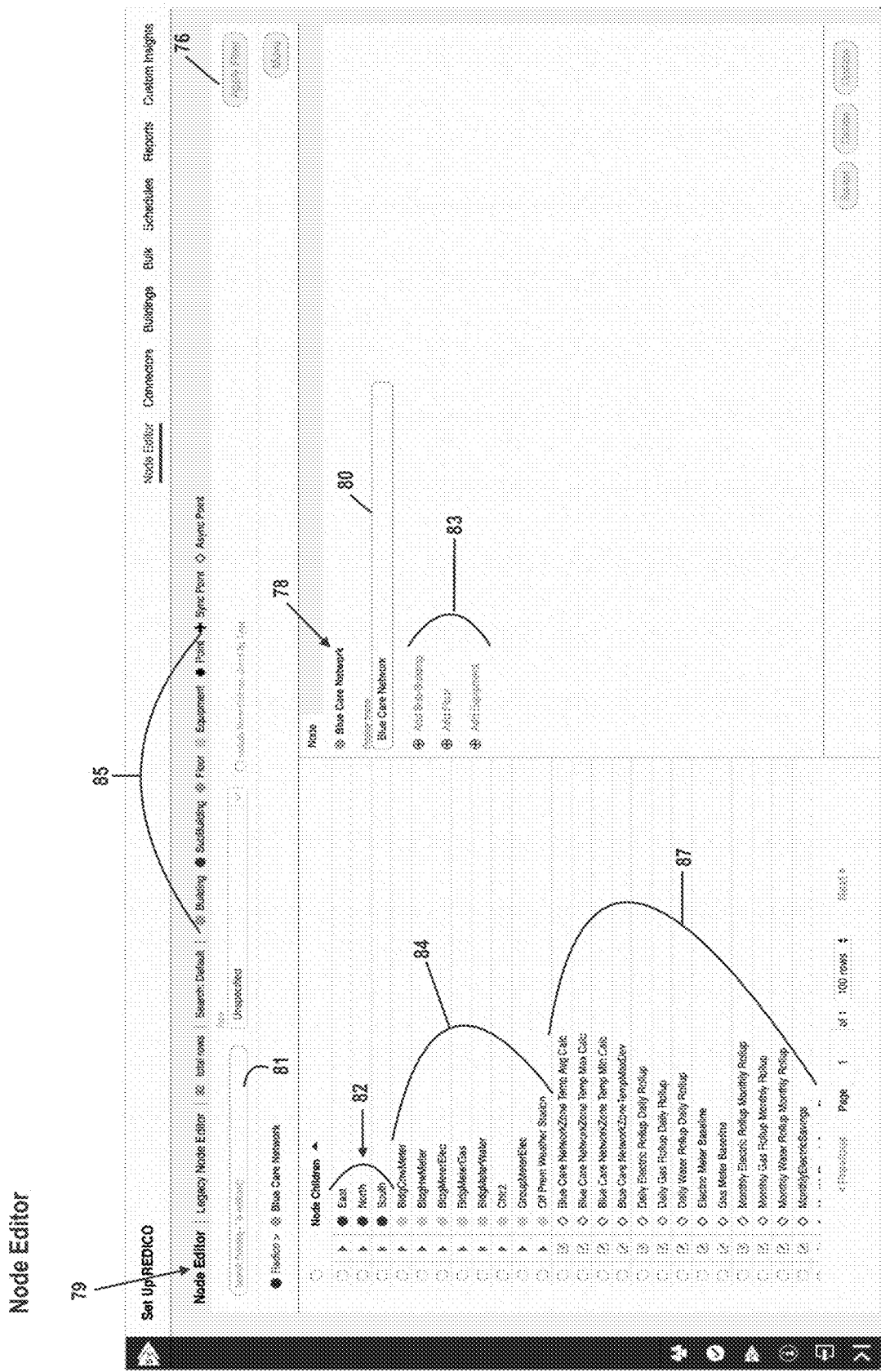
FIG. 6 is a screen shot illustrating the node editor function of the energy management system.
Figure 7:
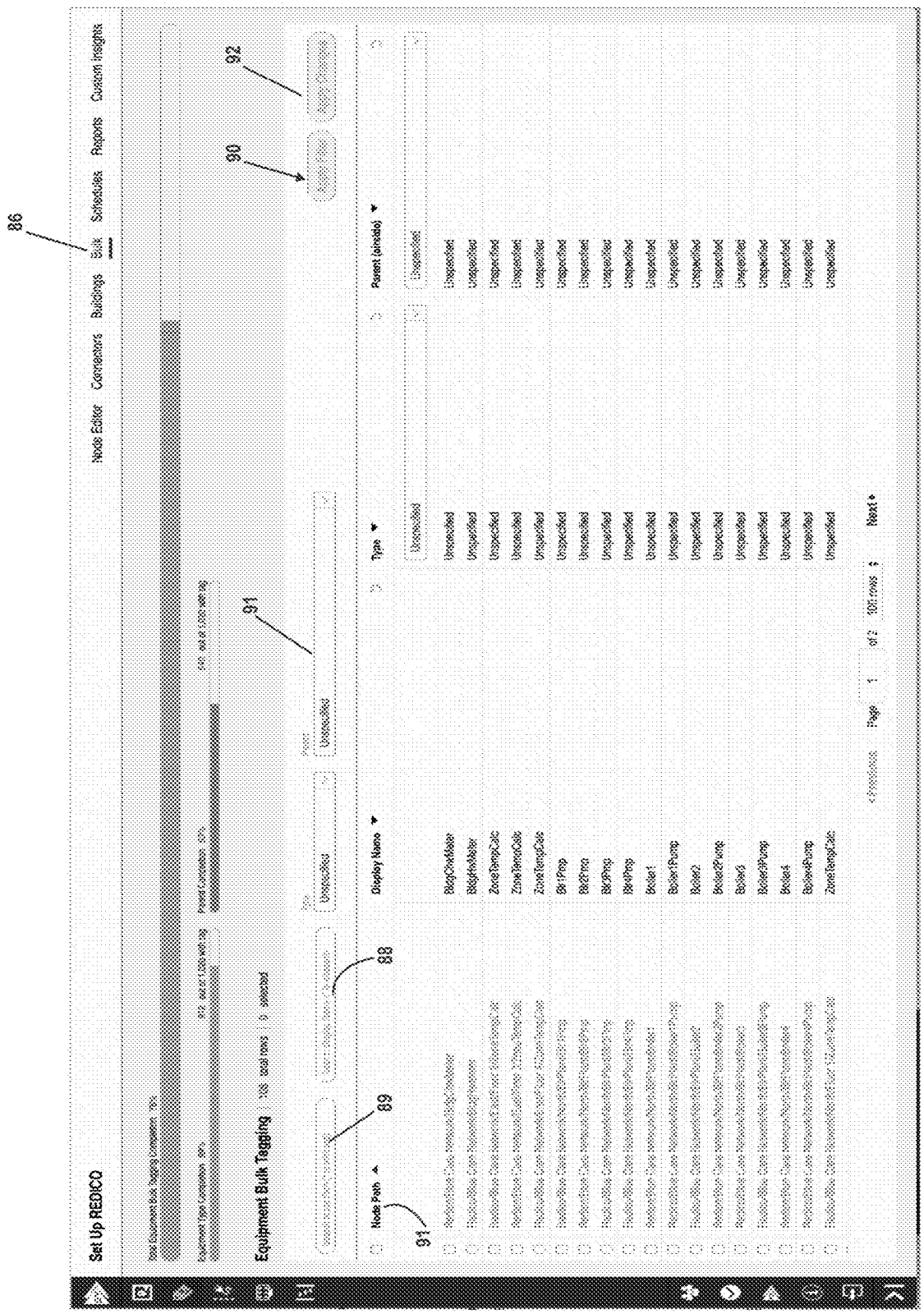
FIG. 7 is a screen shot illustrating the equipment bulk tagging function of the energy management system.
Figure 8:
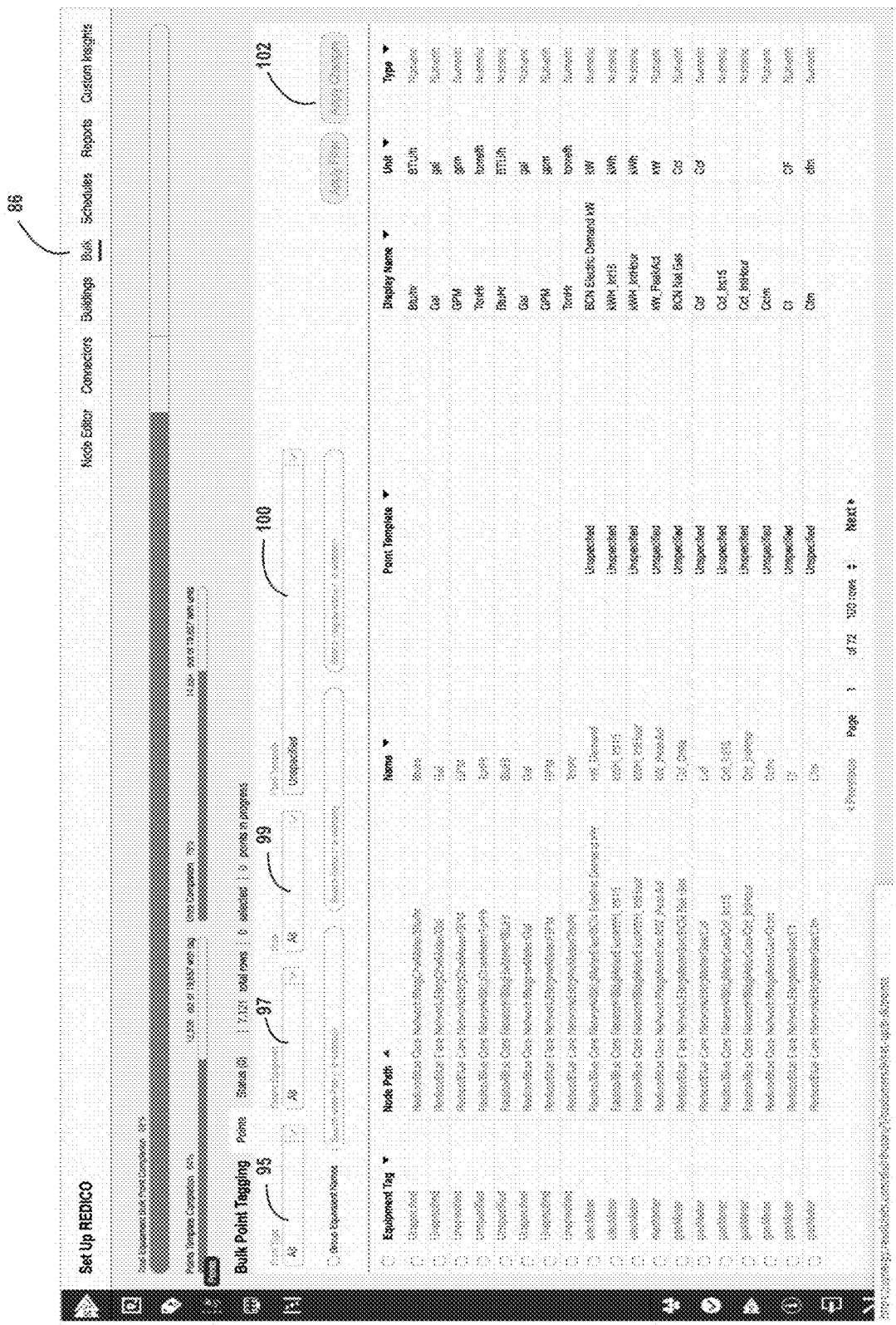
FIG. 8 is a screen shot illustrating the bulk point mapping function of the energy management system.
Figure 9:
FIG. 9 is a screen shot illustrating mapping of the analytical rules to specific pieces of equipment by node path.

Exemplary applications of the point mapper, node editor, equipment and point tagging are illustrated in FIGS. 5-9. FIG. 5 is an exemplary application of the point mapper mode. FIG. 6 is an exemplary application of the node editor mode. FIG. 7 is an exemplary application of the equipment bulk tagging mode. FIG. 8 is an exemplary application of the bulk point tagging mode. FIG. 9 is an exemplary application of the rule mode.

Turning first to FIG. 5, the raw data points are mapped to a file in the cloud by selecting the "Bulk" button 71 at the top of the screen. Selection of the "Bulk" button 71 causes all of the raw data points to be listed in a file with a check box next to each data point. The checkbox allows a user to select each data point to be mapped. For example, a user can map a raw data point, or ignore it by way of the buttons 72 and 74. In particular, selecting the "Map Points" button 72 automatically maps all of the checked data points into the bucket.

Once the raw data points have been mapped, the number of mapped data points, unmapped data points, and ignored data points is listed, as shown by the reference numerals 66, 68 and 70. As shown the exemplary bucket includes 18,845 mapped data points, 147 unmapped data points, and 463 ignored points.

The system allows the mapped data points to be filtered by points, equipment, floor, sub-building or building or by a combination of filters. The raw data strings are parsed, for example, by way of an Excel text to column function that maps data between delimiters in the data string to separate fields to allow filtering of data in the different fields. For the data string mentioned above, the delimiters are forward slashes. Filters may be selected by way of a text box 73 and selecting the "Apply Filter" button 76.

The system also includes a node editor. In general, the node editor function enables each node (each mapped point in the bucket, such as, building, sub-building, floor, equipment or point) to be decomposed to understand what is under them and is used to finalize the hierarchy and verify that bulk mapped points are in the hierarchy of a building. This function also allows nodes to be moved.

In the exemplary application shown in FIG. 6, the "Node Editor" button 79 at the top of the screen is selected for this function. The Node Editor processes data points that have previously been mapped into the bucket and parsed. In this example, the node selected is "Blue Care Network/sub-building/floor/equipment". This node was selected by typing the description of the node into the text box 81 and selecting the "Apply Filter" button 76. In this case, the display 80 indicates the node as Blue Care Network. Also displayed under the display 80 are the child nodes 83, sub-building, floor and equipment. Reference numeral 82 indicates the sub-building while reference numeral 84 illustrates the equipment in the node while reference numeral 87 various child nodes under the Blue Care Network. These child nodes can be selected by checking the check box next to the child node and selecting the "Apply Filter" button 76 to illustrate the nodes or points under a child node.

The system also includes a bulk equipment tagging mode of operation and a bulk point tagging mode of operation. The bulk equipment tagging mode allows equipment to be filtered by node path, display name and type and tagged. An exemplary application of this function is illustrated in FIGS. 7 and 8. This mode may be selected by way of the Bulk button 86 and the text boxes 88 and 89. FIG. 7 relates to bulk equipment tagging and displays all equipment along a node path. FIG. 8 relates to bulk point tagging. Once the equipment or a point is tagged, it can be linked to analytical rules that are used to determine the efficiency of the HVAC equipment on a real-time basis.

With respect to FIG. 7, equipment can be filtered by node path or display name by way of the text boxes 88 and 89. In this case, the data was filtered by the node path "Redico/BlueCare Network". As shown, the node path and equipment type in the node path are listed. Each listing includes a check box that allows a user to select equipment to be tagged. Next, the equipment to be tagged is selected from a drop-down menu 91. For example, the word "Boiler" can be selected from the drop-down menu 91. In order to bulk tag all boilers, the "Apply Changes" button 92 is selected. This would result in bulk tagging all of the displayed names that include the word "Boiler".

FIG. 8 illustrates an example of bulk point tagging and is similar to bulk tagging of equipment but relates to bulk tagging of points. These points include unique name, point type, parent equipment, search name, display name and units. These points can be selected by way of the drop-down menus 95, 97 and 99. The table is then filtered according to the search criteria. Each point includes a check box, as shown. Individual points can be selected by checking individual check boxes or selecting "All" from the Point Type template 95. By selecting the Apply Changes button, the selected points are tagged.

An important aspect of the invention relates to the automatic bulk application of analytical rules to tagged equipment. In particular, the system includes an analytical rules library that is stored in the cloud. Input points for the analytical rules may include point tags and several constants, such as delay, high threshold, low threshold with adjustable defaults and several outputs; Boolean and numeric. The analytical rules library may contain rules on multiple equipment types, for example, an air handling unit ("AHU"), boilers, chiller, pumps, fans, VAV controllers and can be expanded to add additional rules.

The analytical rules are linked to each piece of equipment and may be bulk applied to equipment having the same equipment tag, for example, by way of an Excel connect function that connects one or more specific analytical rules to each piece of equipment. As such, users do not need to know the specific analytic rules that apply to each piece of equipment. To select and apply an analytical rule to a specific equipment, a drop-down menu will only display the rules applicable for the selected equipment type, thus preventing analytical rule errors.

An exemplary application of bulk application of the rules is illustrated in FIG. 9. The rule function is selected by way of the rules button 104 on the top of the screen. The analytical rules can be filtered by node path by way of the text box 106 or by equipment type by way of a drop-down menu 108. The "Apply Filter" button is then selected to display the results based upon the search criteria.

Analytical rules are applied to equipment by selecting a rule from the drop-down menu 110, thereby highlighting the selected check boxes. Once an analytical rule is selected from the drop-down list 110, selection of the "Apply Filter" button 112 applies the selected rule to all equipment in the list containing a selected check box. As shown, once analytical rules are applied to specific equipment, the rules are listed. These rules are used to run analytics 73 (FIG. 2) The analytics may be used to provide a hierarchal representation of time-based HVAC system anomalies as well provide an overall report 75.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A method for managing the energy usage of a building, the method comprising the steps:
    (a) mapping raw HVAC data points from said building into a file;
    (b) filtering said raw data points by equipment, node or point;
    (c) selecting equipment, nodes and points;
    (d) bulk tagging selected equipment and points at the same time; and
    (e) automatically applying analytical rules to tagged equipment and points, wherein the step of applying in bulk one or more analytical rules allows the energy management system to optimize energy usage.

2. The method recited in claim 1, wherein step (a) includes the steps of:
    (a1) mapping said raw data points from a building automation system (BAS) into a file; and
    (a2) parsing said raw data points to enable filtering by: building, sub-building, floor, nodes and equipment.

3. The method as recited in claim 2, wherein said raw data points are bulk-mapped into said file.

4. The method as recited in claim 2, wherein said raw data points are selectively mapped into said file.

5. The method recited in claim 1, further comprising step (f):
    (f) filtering the mapped raw data points by points, equipment, floor, sub-building, building and a combination of the same.

6. The method recited in claim 1, further comprising the steps of:
    (g1) filtering the mapped raw data points by a selected node;
    (g2) displaying a list of all of the nodes under the selected node defining child nodes.

7. The method recited in claim 6, further comprising the steps of;
    (g3) selecting a child node from the display; and
    (g4) filtering the child nodes to illustrate nodes and points under the selected child node.

8. The method recited in claim 1, further including the steps of:
(h1) linking equipment with analytical rules; and
(h2) filtering said equipment by node path, display name and type;
(h3) bulk tagging selected equipment to connect said equipment to an analytical rule.

9. A method for implementing an energy management system for one or more buildings comprising the steps:
receiving unfiltered building time varying raw HVAC data from said one or more buildings;
mapping said time varying raw data into a file;
filtering said raw data points by point;
selecting filtered points;
bulk tagging selected points at the same time; and
automatically applying analytical rules to said tagged points, wherein the step of applying in bulk one or more analytical rules allows the enemy management system to optimize energy usage.

10. A method for implementing an energy management system for one or more buildings, comprising the steps:
receiving unfiltered time varying raw HVAC data from said one or more buildings;
mapping said time varying raw data into a file;
filtering said raw data points by equipment;
selecting filtered equipment;
bulk tagging selected equipment at the same time; and
automatically applying analytical rules to said tagged equipment, wherein the step of applying in bulk one or more analytical rules allows the energy management system to optimize energy usage.

11. A method for implementing an energy management system for one or more buildings, comprising the steps:
receiving unfiltered building time varying raw HVAC data from said one or more buildings;
filtering said raw data points by building;
selecting filtered data points;
bulk tagging said selected data points at the same time; and
automatically applying analytical rules to said tagged data points, wherein the step of applying in bulk one or more analytical rules allows the energy management system to optimize energy usage.

12. A method for implementing an energy management system for one or more buildings, comprising the steps:
mapping said time varying raw data from said one or more buildings into a file;
filtering said raw data points by building floor;
selecting filtered data points;
bulk tagging said selected data points at the same time; and
automatically applying analytical rules to said tagged data points, wherein the step of applying in bulk one or more analytical rules allows the energy management system to optimize energy usage.

* * * * *